(12) United States Patent
Ahn et al.

(10) Patent No.: US 8,301,094 B2
(45) Date of Patent: Oct. 30, 2012

(54) MOBILE TERMINAL HAVING MULTIPLE ANTENNAS AND ANTENNA INFORMATION DISPLAY METHOD THEREOF

(75) Inventors: Seung-Jin Ahn, Gyeonggi-Do (KR); Won-Yong Yoon, Seoul (KR); Byong-Yol Lee, Gyeonggi-Do (KR); Kwang-Il Kim, Gyeonggi-Do (KR); Su-Hwan Lim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 380 days.

(21) Appl. No.: 12/650,450

(22) Filed: Dec. 30, 2009

(65) Prior Publication Data

US 2010/0167672 A1 Jul. 1, 2010

(30) Foreign Application Priority Data

Dec. 31, 2008 (KR) .................. 10-2008-0138698

(51) Int. Cl.
*H04B 7/08* (2006.01)
(52) U.S. Cl. ................. 455/132; 455/277.2; 455/575.7; 343/834

(58) Field of Classification Search .......... 455/132–135, 455/277.1, 277.2, 550.1, 575.1–575.7; 343/729, 343/834, 835, 853
See application file for complete search history.

(56) References Cited

U.S. PATENT DOCUMENTS 7,847,740 B2 * 12/2010 Dunn et al. .................. 343/702
2008/0085739 A1 * 4/2008 Kitakado .................. 455/562.1
* cited by examiner

*Primary Examiner* — Nhan Le
(74) *Attorney, Agent, or Firm* — Lee, Hong, Degerman, Kang & Waimey

(57) ABSTRACT

A mobile terminal having multiple antennas and an antenna information display method of the mobile terminal are disclosed. Downlink signals are received through the multiple antennas, a channel state of each antenna is measured, and whether or not each antenna needs to be adjusted or an actual channel measurement value are displayed based on the measured channel state information and an antenna setting mode. Thus, a user can check an antenna with a poor reception performance by using the antenna adjustment information or the actual channel measurement value for antenna adjustment, and easily adjust the direction of the antennas.

25 Claims, 11 Drawing Sheets

| SIGNAL PERFORMANCE ITEM | |
|---|---|
| CQI | CHANNEL PERFORMANCE |
| BER | BER |
| RSSI | RECEPTION SIGNAL STRENGTH |
| RSCP | RECEPTION SIGNAL POWER |

MOBILE TERMINAL HAVING MULTIPLE ANTENNAS AND ANTENNA INFORMATION DISPLAY METHOD THEREOF

CROSS REFERENCE TO RELATED APPLICATIONS

The present application claims priority to Korean Application No. 10-2008-0138698 filed in Korea on Dec. 31, 2008, the entire contents of which is hereby incorporated by reference in its entirety.

BACKGROUND OF THE INVENTION

1. Field of the Invention

The present invention relates to a mobile terminal having multiple antennas and an antenna adjustment (i.e., regulation) information display method thereof.

2. Description of the Related Art

A mobile terminal is a device that can be carried around and has one or more functions such as voice and video call communication, inputting and outputting information, storing data, and the like. A mobile terminal may be configured to perform diverse functions. Such diverse functions may include a data and voice communication function, a function of capturing a photo image or video through a camera, a voice storage function, a music file reproducing function through a speaker system, an image or video display function, and the like. Some mobile terminals include an additional function allowing playing games, and other mobile terminals are implemented as multimedia players. Recently, mobile terminals allow users to receive broadcast or multicast signals to view video or television programs.

Efforts are ongoing to support and increase the functionality of mobile terminals. Such efforts include software and hardware improvements, as well as changes and improvements in the structural components which form the mobile terminal.

An evolution-UMTS (E-UMTS) system, evolved from a UMTS system, proceeds with a basic standardization in 3GPP. The E-UMTS system is also called a long term evolution (LTE) system.

An E-UMTS network includes an E-UTRAN and a core network (CN). The E-UTRAN includes a base station (BS) (eNode B or eNB), and the CN includes an access gateway (AG). The AG may be divided into a part for processing user traffic and a part for processing controlling traffic. In this case, the gateway for processing user traffic and the gate way for processing the controlling traffic may communicate by using a new interface. One or more cells may exist in a single BS, and an interface for transmitting user traffic or control traffic may be used between BSs. The CN may be configured as a node for registering the gateways and terminal (UE) users, and the like.

The LTE is the latest communication technique scheme devised to download a great deal of data. Unlike the WCDMA or GSM, the communication scheme such as the LTE or WiMax can implement a high data rate by employing multi-antenna algorithm called MIMO (Multiple Input Multiple Output).

The MIMO is a system in which a device includes multiple antennas, for example, two, four, eight antennas, to improve a reception performance of the antennas by using a diversity technique and beamforming technique.

In the LTE system including multiple antennas, some devices (terminals, smart phones, peripheral devices for notebook computers, or the like) have an antenna which can be protruded to move in every direction. Accordingly, a user can move the device or the antenna upon viewing throughput in receiving data.

In this case, however, the user's determining a reception state based on his intuitional throughput possibly causes an error. That is, if the device is performing handover or if the device or the terminal is located between two BSs, the user cannot know whether or not the currently indicated throughput is optimal.

In general, in the LTE system, the BS provides a service by applying fairness (namely, by fairly scheduling so that a particular terminal or device may not receive much service) according to a radio environment and the number of terminals (or devices) currently connected to the BS. This is because if several terminals attempt connection to the BS, throughput would degrade.

Thus, in order to determine throughput of a downlink signal in the LTE system, it is presupposed that the terminal and the BS are connected and data is transmitted and received so as to be basically measured. In addition, in the occurrence of handover, when the BS limits throughput of the terminal, which has performed handover, (under various conditions), the terminal cannot determine whether or not the limitation of throughput has been caused by a change in a radio environment or by a logical reason. For these reasons, there would be a high possibility of an error if the user determines the reception state unconditionally with the downlink throughput in the LTE system.

In addition, when the user determines the reception state with the throughput, the user can hardly determine which antenna needs to be adjusted (or regulated). The reason is because the throughput in the LTE refers to throughput with respect to the overall reception state, rather than being discriminated by antennas. Although it is not in a handover situation, in general, throughput may change between calls even not in a radio environment.

Thus, if a reception performance with respect to each antenna, namely, each channel, is indicated before the device, namely, the mobile terminal, employing (or that may employ) the multi-antenna technique called MIMO is connected for a call with the BS or while the device (or the mobile terminal) is being connected with the BS for a call.

SUMMARY OF THE INVENTION

Accordingly, one object of the present invention is to address the above-noted and other problems.

Another object of the present invention is to provide a mobile terminal including multiple antennas capable of indicating a channel performance of each antenna in real time, and an antenna information display method of the mobile terminal.

Still another object of the present invention is to provide a mobile terminal including multiple antennas capable of providing information for adjusting each antenna based on each antenna channel information, and an antenna information display method of the mobile terminal.

To achieve these and other advantages and in accordance with the purpose of the present invention, as embodied and broadly described herein, the present invention provides in one aspect a mobile terminal including: multiple antennas configured to receive a downlink signal; a memory configured to store an antenna setting mode; and a controller configured to measure a channel state of each antenna and displaying antenna adjustment information on a screen according to the measured channel state information and the stored antenna setting mode.

The multiple antennas may be configured as external antennas or internal antennas of a terminal or a device, or may be configured as mixed-type antennas including some external antennas and some internal antennas (namely, some antennas are installed at an outer side of the terminal or device while the others are installed within the terminal or device).

The channel state information may include a reception power (namely, a reference signal received power (RSRP)), a bit error rate (BER) of each antenna, a reception performance (namely, a channel quality indicator (CQI)), and a reception power (Pwr) of each antenna.

The antenna adjustment information (i.e., antenna adjustment information) may include an antenna list indicating whether or not each antenna needs to be adjusted, or an antenna which needs to be adjusted, and may be displayed in a pop-up window or in the form of a message. In this case, the antennas that need to be adjusted on the antenna list are displayed to be discriminated from other antennas by using color, a character size or a check box.

When the multiple antennas are external antennas, the controller may display the external antennas that need to be adjusted on the screen, and when the multiple antennas are internal antennas, the controller may display a direction in which the internal antennas to be adjusted are positioned.

When the multiple antennas are mixed-type antennas including both internal antennas and external antennas, the controller may display external antennas to be adjusted and a direction in which the internal antennas are positioned.

In another aspect, the present invention provides an antenna information display method of a mobile terminal, including: receiving downlink signals through multiple antennas; measuring channel state information of each antenna; and displaying antenna adjustment information based on the measured channel state information and an antenna setting mode.

The multiple antennas may be configured as external antennas or internal antennas of a terminal or a device, or may be configured as mixed-type antennas including some external antennas and some internal antennas (namely, some antennas are installed at an outer side of the terminal or device while the others are installed within the terminal or device).

The channel state information may include a reception power (namely, a reference signal received power (RSRP)), a bit error rate (BER) of each antenna, a reception performance (namely, a channel quality indicator (CQI)), and a reception power (Pwr) of each antenna.

The antenna adjustment information (or antenna adjustment information) may be displayed in the form of a list in a pop-up window or in the form of a message and displayed in color, a character size or in the form of a check box so as to be discriminated from other antennas.

When the multiple antennas are external antennas, the antenna adjustment information may indicate external antennas that need to be adjusted, and when the multiple antennas are internal antennas, the antenna adjustment information may indicate a direction in which the internal antennas are positioned.

When the multiple antennas are mixed-type antennas including both internal antennas and external antennas, the antenna adjustment information may indicate external antennas to be adjusted and a direction in which the internal antennas are positioned.

The displaying of the antenna adjustment information may include: determining a channel state of each antenna based on the measured channel state information; checking an antenna setting mode in a user menu; if the antenna setting mode is a general user mode, displaying whether or not antennas are to be adjusted on a screen; and if the antenna setting mode is an expert mode, displaying the measured channel state information on the screen.

The displayed channel state information may include a reception power (RSRP) and a bit error rate (BER) of each antenna.

The displayed channel state information may include a reception performance (CQI) and a reception power (Pwr) of each antenna.

When the mobile terminal is performing handover, the antenna adjustment information may not be displayed on the screen.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself. Accordingly, the 'module' and 'part' may be mixedly used.

Mobile terminals may be implemented in various forms. For example, the terminal described in the present invention may include mobile terminals such as mobile phones, smart phones, notebook computers, digital broadcast receivers, PDAs (Personal Digital Assistants), PMPs (Portable Multimedia Player), navigation devices, and the like, and fixed terminals such as digital TVs, desk top computers and the like. Hereinafter, it is assumed that the terminal is a mobile terminal. However, it would be understood by a person in the art that the configuration according to the embodiments of the present invention can be also applicable to the fixed types of terminals, except for any elements especially configured for a mobile purpose.

Figure 1:
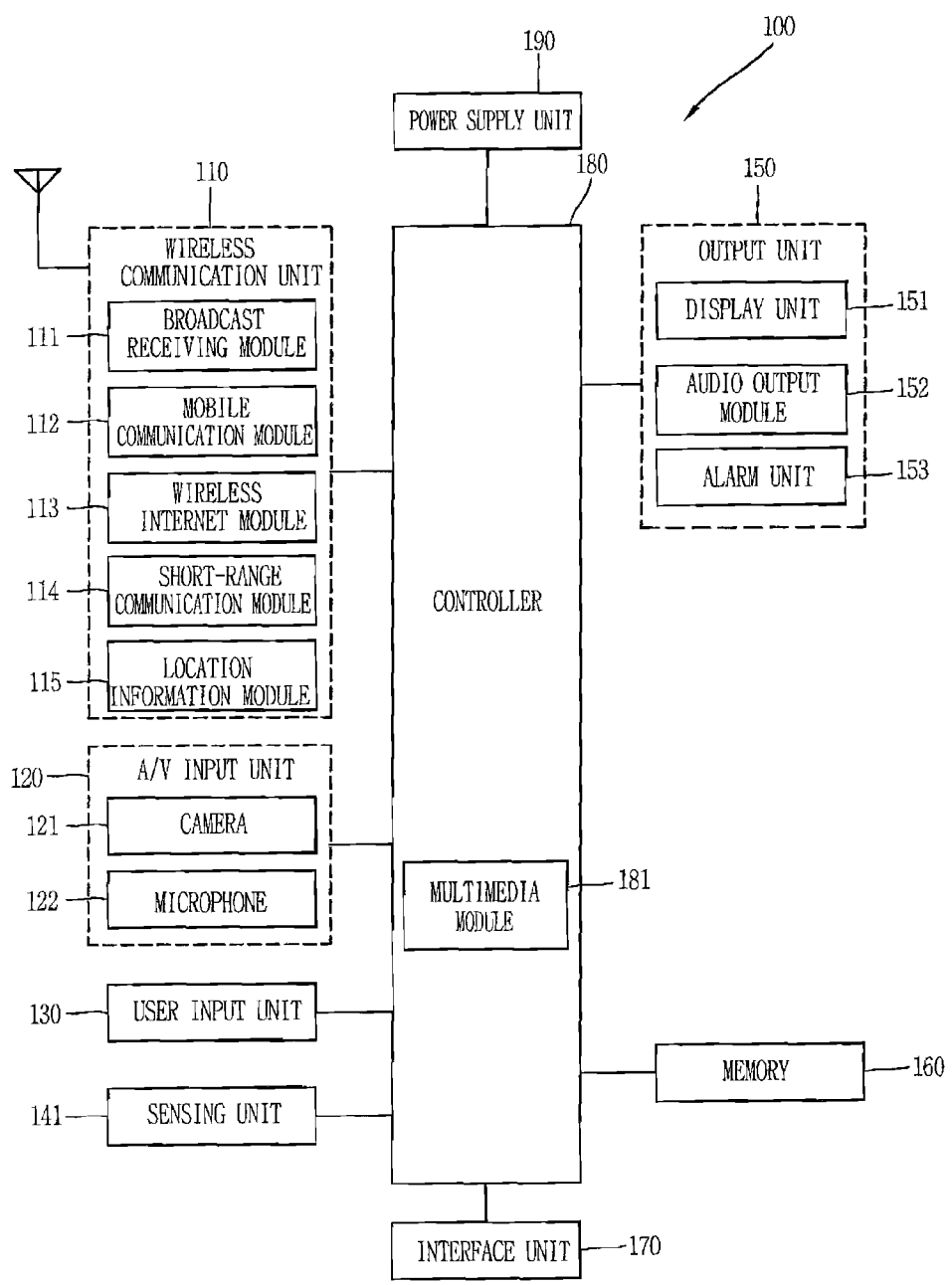
FIG. 1 is a schematic block diagram of a mobile terminal implementing an embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System). According to the current technology, the GPS module 115 calculates distance information from three or more satellites and accurate time information and applies trigonometry to the calculated information to thereby accurately calculate three-dimensional current location information according to latitude, longitude, and altitude. Currently, a method for calculating location and time information by using three satellites and correcting an error of the calculated location and time information by using another one satellite. In addition, the GPS module 115 can calculate speed information by continuously calculating the current location in real time.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141. This will be described in relation to a touch screen later.

The interface unit 170 (or other connection means) serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

The identification module may be a memory chip (or other element with memory or storage capabilities) that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile terminal 100 or may be used to transfer data between the mobile terminal and an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent to allow viewing of the exterior, which may be called transparent displays. A typical transparent display may be, for example, a TOLED (Transparent Organic Light Emitting Diode) display, or the like. The mobile terminal 100 may include two or more display units (or other display means) according to its particular desired embodiment. For example, the mobile terminal may include both an external display unit (not shown) and an internal display unit (not shown). The touch screen may be configured to detect even a touch input pressure as well as a touch input position and a touch input area.

A proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like.

The operational principle of the RF oscillation type proximity sensor, among the implementable proximity sensors, will be described as an example. When an object approaches the sensor detection surface in a state that an RF (Radio Frequency) of a static wave is oscillated by an oscillation circuit, the oscillation amplitude of the oscillation circuit is attenuated or stopped, and such a change is converted into an electrical signal to detect the presence or absence of an object. Thus, even if any material other than metallic one is positioned between the RF oscillation proximity sensor and the object, a proximity switch can detect the object intended to be detected without an interference by the object.

Without the proximity sensor 141, if the touch screen is an electrostatic type, the approach of a pointer (stylus) can be detected based on a change in a field according to the approach of the pointer.

Thus, although the pointer is not actually brought into contact with the touch screen but merely positioned close to the touch screen, the position of the pointer and the distance between the pointer and the touch screen can be detected. In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152.

The memory 160 (or other storage means) may store software programs or the like used for the processing and controlling operations performed by the controller 180, or may temporarily store data (e.g., a phonebook, messages, still images, video, etc.) that have been outputted or which are to be outputted. Also, the memory 160 may store data regarding various patterns of vibrations and audio signals outputted when a touch is applied to the touch screen.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage device that performs the storage function of the memory 160 over a network connection.

The controller 180 (such as a microprocessor or the like) typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180.

The controller 180 may perform a pattern recognition processing to recognize a handwriting input or a picture drawing input performed on the touch screen as characters or images.

The power supply unit 190 receives external power (via a power cable connection) or internal power (via a battery of the mobile terminal) and supplies appropriate power required for operating respective elements and components under the control of the controller 180.

Various embodiments as described herein may be implemented in a computer-readable medium using, for example, computer software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180.

For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

So far, the mobile terminal has been described from the perspective of its functions. Hereinafter, external elements of the mobile terminal will be described from the perspective of their functions with reference to FIGS. 2 and 3. The mobile terminal may be implemented in a variety of different configurations. Examples of such configurations include folder-type, bar-type, swing-type, a slide type, as well as various other configurations. The following description will primarily relate to a slide-type mobile terminal. However, such description can equally apply to other types of mobile terminals.

Figure 2:
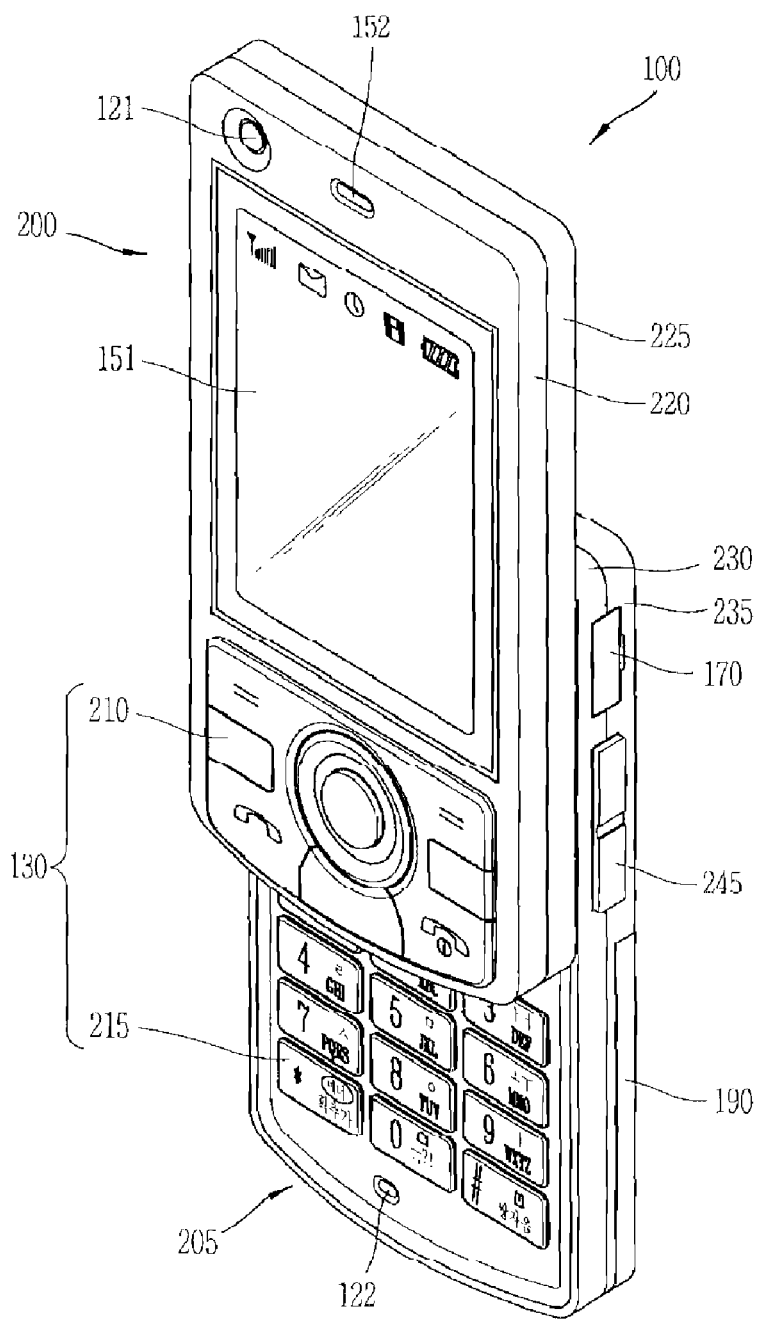
FIG. 2 is a front perspective view of a mobile terminal implementing an embodiment of the present invention.

FIG. 2 is a front perspective view of the mobile terminal according to an exemplary embodiment of the present invention.

The mobile terminal 100 according to the present invention includes a first body 200, and a second body 205 that can be slidably moved along at least one direction with respect to the first body 200. In case of a folder type mobile phone, the mobile terminal 100 may include a first body and a second body having one side that can be folded or unfolded with respect to the first body.

A state in which the first body 200 is disposed to overlap with the second body 205 may be called a closed configuration, and as shown in FIG. 2, a state in which at least a portion of the second body 205 is exposed may be called an open configuration.

Although not shown, the mobile terminal according to the present invention may be a folder type mobile terminal including a first body and a second body having one side to be folded or unfolded with respect to the first body. Here, a state in which the second body is folded may be called a closed configuration, and a state in which the second body is unfolded may be called an open configuration.

In addition, although not shown, the mobile terminal according to the present invention may be a swing type mobile terminal including a first body and a second body configured to be swingable with respect to the first body. Here, a state in which the first body is disposed to overlap with the second body may be called a closed configuration, and a state in which the second body is swung to expose a portion of the first body may be called an open configuration.

The folder type mobile terminal and the swing type mobile terminal can be easily known by the skilled person in the art without any explanation, so its detailed description will be omitted.

In the closed configuration, the mobile terminal 100 mainly operates in a standby (or idle) mode, and the standby mode may be released upon user manipulation. The mobile terminal operates mainly in the calling mode or the like in the open configuration, and it can be changed to the standby mode with the lapse of time or upon user manipulation.

The case (or casing, housing, cover, etc.) constituting the external appearance of the first body 200 may include a first front case 220 and a first rear case 225. Various electronic components are installed in the space between the first front case 220 and the first rear case 225. One or more intermediate cases may be additionally disposed between the first front case 220 and the first rear case 225.

The cases may be formed by injection-molding a synthetic resin or may be made of a metallic material such as stainless steel (STS) or titanium (Ti), etc.

The display unit 151, the audio output module 152, the camera 121 or the first user input unit 210 may be located at the first body 200, specifically, on the first front case 220 of the first body 200.

The display unit 151 has been described in relation to FIG. 1, so its detailed description will be omitted for the sake of brevity.

The audio output unit 152 may be implemented in the form of a speaker or other sound producing device.

The camera 121 may be implemented to be suitable for capturing images or video with respect to the user and other objects.

Like the first body 200, the case constituting the external appearance of the second body 205 may include a second front case 230 and a second rear case 235.

A second user input unit 215 may be disposed at the second body, specifically, at a front face of the second body 205.

A third user input unit 245, the microphone 122, and the interface unit 170 may be disposed on at least one of the second front case 230 and the second rear case 235.

The first to third user input units 210, 215 and 245 may be generally referred to as a manipulating portion 130, and various methods and techniques can be employed for the manipulation unit so long as they can be operated by the user in a tactile manner.

For example, the user input units 130 can be implemented as dome switches, actuators, or touch pad regions that can receive user commands or information according to the user's touch operations (e.g., pressing, pushing, swiping, drag-and-drop, etc.) or may be implemented in the form of a rotatable control wheel (or disc), keys or buttons, a jog dial, a joystick, or the like.

In terms of their functions, the first user input unit 210 is used for inputting (entering) commands such as start, end, scroll or the like, and the second user input unit 215 is used for inputting (entering) numbers, characters, symbols, or the like. The first user input unit 210 may include a soft key used by interworking with icons displayed on the display unit 151 and navigation key (largely including four direction keys and a central key) for indicating and checking directions.

Also, the third user input unit 245 may support the so-called hot key functions that allow more convenient activation of particular functions for the mobile terminal.

The microphone 122 (or other sound pick-up device) may be appropriately implemented to detect user voice inputs, other sounds, and the like.

The interface unit 170 may be used as a communication link (or passage, path, etc.) through which the terminal can exchange data or the like with an external device. The interface unit 170 has been described in relation to FIG. 1, so its detailed description will be omitted.

The power supply unit 190 for supplying power to the terminal may be located at the second rear case 235.

The power supply unit 190 may be, for example, a rechargeable battery that can be detached.

Figure 3:
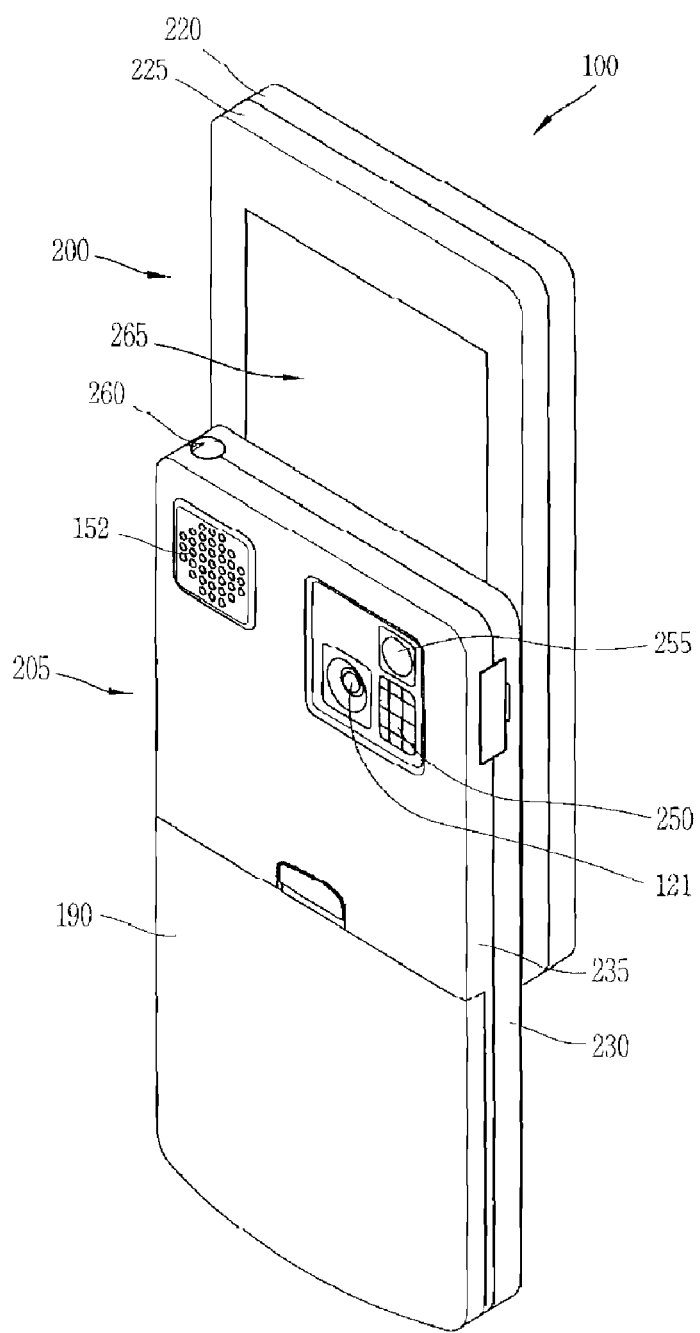
FIG. 3 is a rear perspective view of a mobile terminal implementing an embodiment of the present invention.

FIG. 3 is a rear perspective view of the mobile terminal of FIG. 2 according to an exemplary embodiment.

As shown in FIG. 3, a camera 121 (or other image pick-up device) may additionally be disposed on a rear surface of the second rear case 235 of the second body 205. The camera 121 of the second body 205 may have an image capture direction which is substantially opposite to that of the camera 121 of the first body 200 (namely, the two cameras may be implemented to face towards opposing directions, such as front and rear), and may support a different number of pixels (i.e., have a different resolution) than the camera 121 of the first body.

For example, the camera of the first body 200 may operate with a relatively lower resolution to capture an image(s) of the user's face and immediately transmit such image(s) to another party in real-time during video call communication or the like in which reverse link bandwidth capabilities may be limited. Also, the camera of the second body 205 may operate with a relatively higher resolution to capture images of general objects with high picture quality, which may not require immediately transmission in real-time, but may be stored for later viewing or use.

Additional camera related components, such as a flash 250 and a mirror 255, may be additionally disposed adjacent to the camera 121. When an image of the subject is captured with the camera 121 of the second body 205, the flash 250 illuminates the subject. The mirror 255 allows the user to see himself when he wants to capture his own image (i.e., self-image capturing) by using the camera 121 of the second body 205.

The second rear case 235 may further include an audio output module 152.

The audio output module 152 of the second body 205 may support stereophonic sound functions in conjunction with the audio output module 152 of the first body 200 and may be also used for sending and receiving calls in a speaker phone mode.

A broadcast signal receiving antenna 260 may be disposed (externally or internally) at one side or region of the second rear case 235, in addition to an antenna that is used for mobile communications. The antenna 260 can also be configured to be retractable from the second body 205.

One part of a slide module 265 that allows the first body 200 and the second body 205 to slide relative to each other may be disposed on the first rear case 225 of the first body 200.

The other part of the slide module 265 may be disposed on the second front case 230 of the second body 205, which may not be exposed as shown in the drawing.

The second camera 121 and other components may be disposed on the second body 205, but such configuration is not meant to be limited.

For example, one or more of the elements (e.g., 260, 121 and 250 and 152 etc.), which are disposed on the second rear case 235 may be mounted on the first body 200, mainly, on the first rear case 225. In this case, those elements disposed on the first rear case 225 can be protected (or covered) by the second body 205 in the closed configuration. In addition, even if a separate camera is not provided at the second body, the camera module 121 may be configured to rotate (or otherwise be moved) to thus allow image capturing in various directions.

The mobile terminal 100 as shown in FIGS. 1 to 3 may be configured to operate with a communication system, which transmits data via frames or packets, such as wired and wireless communication systems, as well as satellite-based communication systems.

Such communication systems in which the mobile terminal according to the present invention can operate will now be described with reference to FIG. 4.

Such communication systems may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), global system for mobile communications (GSM), and the like. As a non-limiting example, the description hereafter relates to a CDMA communication system, but such teachings apply equally to other types of systems.

Figure 4:
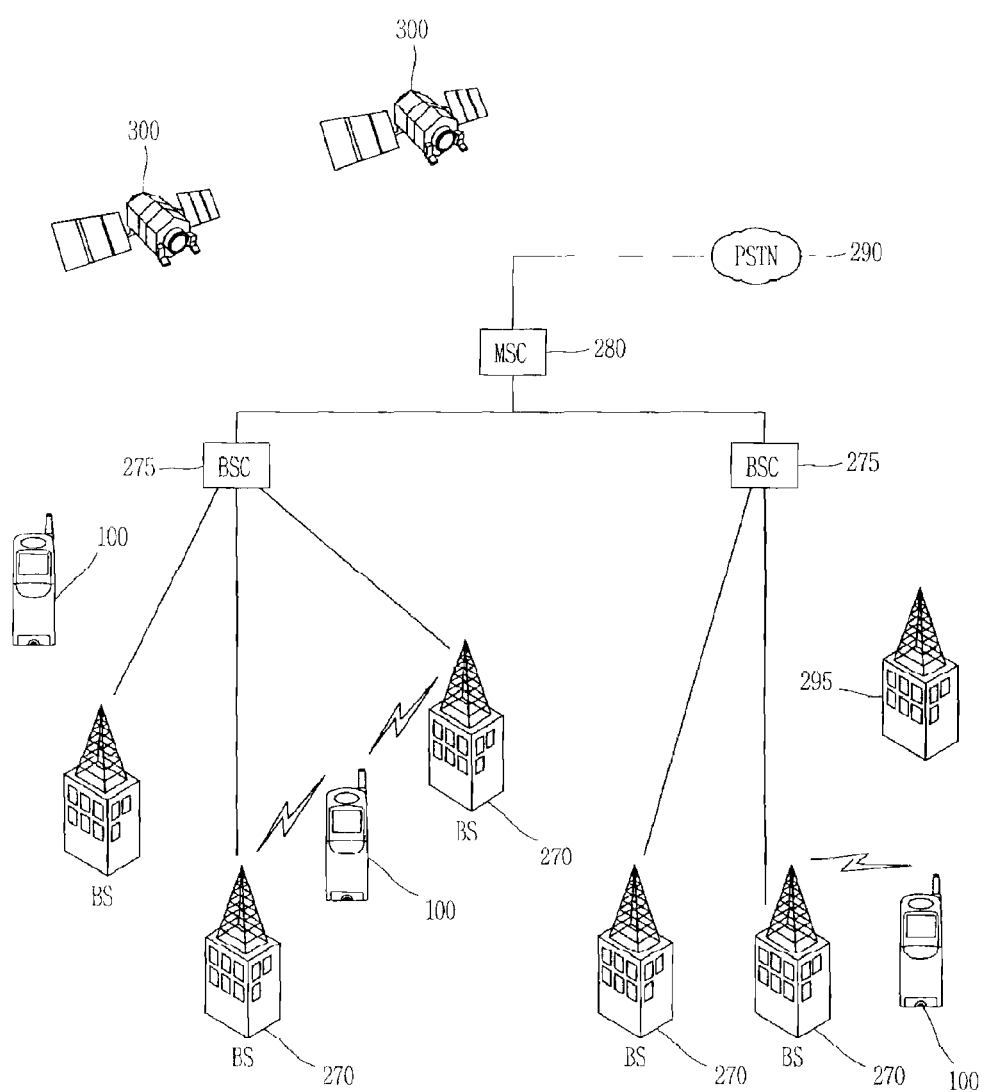
FIG. 4 is a block diagram of a wireless communication system with which the mobile terminal according to an embodiment of the present invention is operable.

Referring to FIG. 4, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 4 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs) or other equivalent terms. In such case, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 4, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295. In FIG. 4, several global positioning systems (GPS) satellites 300 are shown. The satellites 300 help locate at least one of a plurality of terminals 100. In FIG. 4, several satellites 300 are depicted, but it is understood that useful positioning information may be obtained with any number of satellites. The GPS module 115 as shown in FIG. 1 is typically configured to cooperate with the satellites 300 to obtain desired positioning information. Instead of or in addition to GPS tracking techniques, other technologies that may track the location of the mobile terminals may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engaging in calls, messaging, and other types of communications. Each reverse-link signal received by a particular base station 270 is processed within the particular BS 270. The resulting data is forwarded to an associated BSC 275. The BSC provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

In order to enhance reception performance in a mobile terminal having multiple antennas, the present invention proposes a method of displaying a reception performance of each antenna on a display unit before the mobile terminal is connected with a base station for a call or while the mobile terminal is being connected with the base station for a call to allow a user to actively adjust the direction of the antennas or the location of the mobile terminal based on the reception performance of the antennas.

Preferably, the multiple antennas include internal antennas, external antennas, or a mixed-type of antennas including both internal antennas and external antennas.

Preferably, the reception performance includes a bit error rate (BER) or a reception power value transmitted by the BS on a communication protocol, and further includes a reference signal received power (RSRP) or a channel quality indicator (CQI) acquired through measurement.

As for the reception performance, a state of each antenna is displayed on a display unit. If the terminal is in a handover situation, an alarm signal regarding a change in the direction of a particular antenna is not provided to the user. Also, when the device for displaying the reception performance is a notebook computer, the reception performance may be provided to the user through a pop-up window.

When all the multiple antennas are internal antennas, the direction in which the internal antennas are installed is displayed on the display unit, so that the user can change the terminal in the displayed direction. Also, when some of the multiple antennas are internal antennas and the other remaining antennas are external antennas, both antenna states and antenna directions are displayed.

Figure 5:
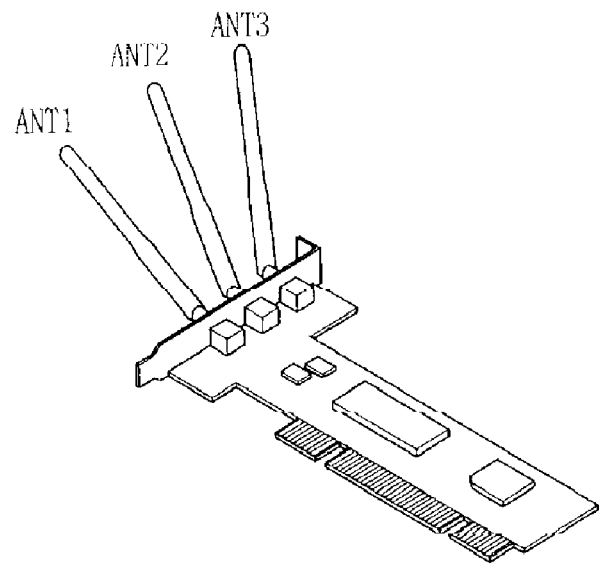
FIG. 5 illustrates an external LTE data card of a notebook computer as an example of an LTE device having multiple antennas according to an exemplary embodiment of the present invention.

FIG. 5 illustrates an external LTE data card of a notebook computer as an example of an LTE device having multiple antennas according to an exemplary embodiment of the present invention.

As shown in FIG. 5, the external data card of a notebook computer is expected to be rolled out in a commercial type of an LTE system at an early stage, which may be implemented in the form of a USB dongle or a PCMCIA having three external antennas ANT1 to ANT3.

Figure 6:
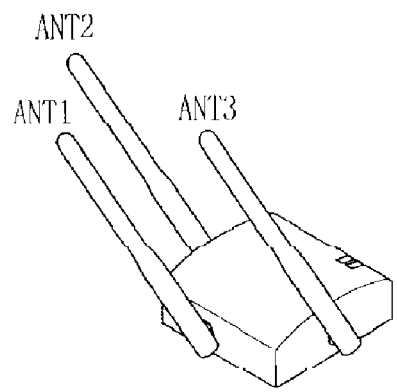
FIG. 6 illustrates a peripheral device connected to a personal computer (PC) as an example of an LTE device having multiple antennas according to an exemplary embodiment of the present invention.

FIG. 6 illustrates a peripheral device connected to a personal computer (PC) as an example of an LTE device having multiple antennas according to an exemplary embodiment of the present invention. In FIG. 6, the PC peripheral device having the three external antennas ANT1 to ANT3 receive signals via each antenna and transmits the received signals to a fixed type device, for example, a PC or a notebook computer, wirelessly or via a cable.

Figure 7:
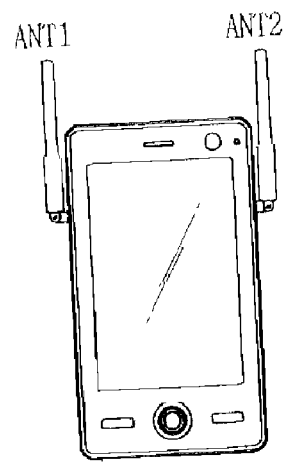
FIG. 7 illustrates a mobile terminal having internal or external antenna as an example of an LTE device having multiple antennas according to an exemplary embodiment of the present invention.

FIG. 7 illustrates a mobile terminal having internal or external antenna as an example of an LTE device having multiple antennas according to an exemplary embodiment of the present invention The mobile terminal having multiple antennas as shown in FIG. 7 includes two external antennas attached to the side portions thereof, which can be applicable when a service frequency is low. More internal antennas are anticipated to be installed, and in case where four reception antennas are to be supported, some of the antennas may be implemented as external antennas.

The LTE basically includes two or more reception antennas in order to guarantee a large capacity of downlink throughput, and in case of an LTE-advanced, it is configured to accommodate eight antennas. For example, the current standard specification describes content of using two to four antennas. Here, 4×2 and 2×2 means that four or two antennas are used for BS transmission and two antennas are used for a terminal reception, and 4×4 means that four antennas are used for BS transmission and four antennas are used for terminal reception.

Figure 8:
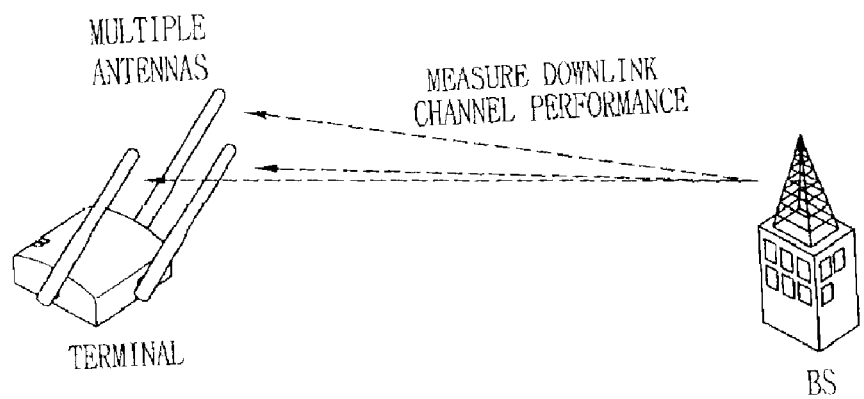
FIG. 8 illustrates an example of a MIMO channel environment according to an exemplary embodiment of the present invention.

FIG. 8 illustrates an example of a MIMO channel environment according to an exemplary embodiment of the present invention.

As shown in FIG. 8, a signal transmitted from the BS is received by each antenna mounted in the terminal. Thus, a reception performance (i.e., quality) of each antenna is physically different due to various environmental factors.

Figures 9, 10:
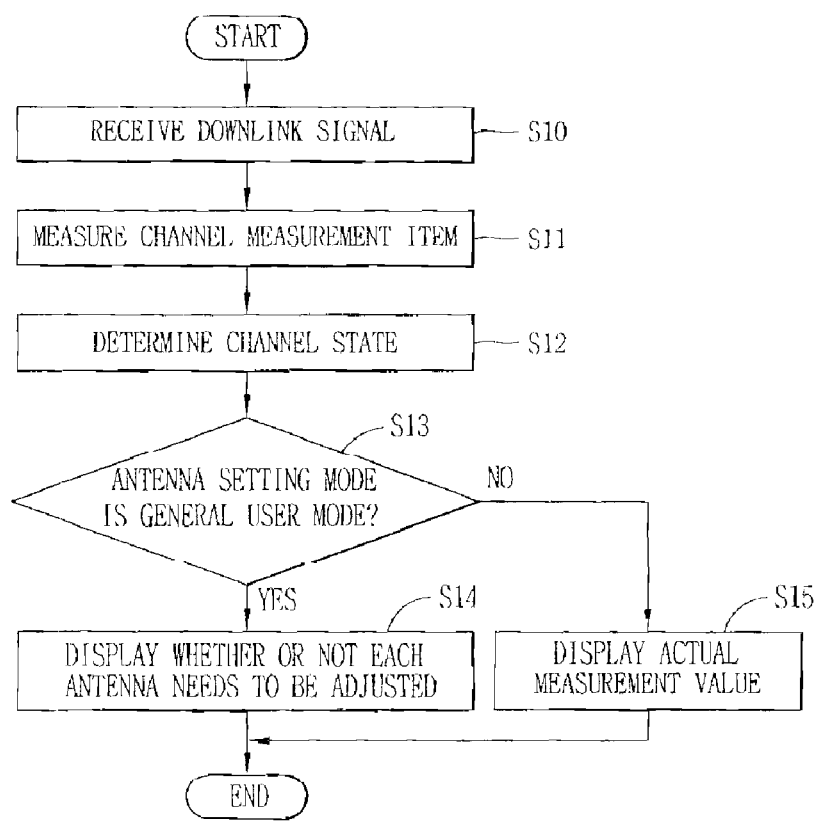
FIG. 9 is a table of signal performance items to be measured in an LTE.
FIG. 10 is a flow chart illustrating the process of a channel state display method of a mobile terminal having multiple antennas according to an exemplary embodiment of the present invention.

In the present invention, whether or not antennas are to be adjusted by using various measurement values defined in the LTE standard can be checked. FIG. 9 is a table of signal performance items to be measured in the LTE. As shown in FIG. 9, the LTE standard defines that a lower layer of the terminal measures signals performance items and report them to an upper layer. In an exemplary embodiment of the present invention, the lower layer (e.g., a medium access control (MAC) layer) and the upper layer (e.g., a radio link control (RLC) layer) will be collectively referred to as a controller 180 hereinbelow.

In an exemplary embodiment of the present invention, an adjustment state of antenna or an actual measurement value of an actually received signal can be informed in a pop-up manner in the terminal or the notebook computer by using the measured signal performance items.

To this end, the LTE defines a signal performance item assisting the antennas to move in a direction in which downlink throughput or assisting changing of the direction of the device is enhanced by using information indicating a downlink channel state. Also, in an exemplary embodiment of the present invention, the antennas are moved or the direction of the device is adjusted by using a reception power measurement item called the RSRP defined in the LTE standard. The CQ is different from the CQI used in the LTE standard.

The CQ includes, for example, a BER indicating how many bit errors have been generated and power (or strength) of a reception signal. Here, the BER is an item indicating a state of a pilot signal, which is used as an objective index in the LTE. In the MIMO, originally, the CQ with respect to each antenna is a value transmitted to an upper layer.

In an exemplary embodiment of the present invention, the CQ (BER or reception power) is displayed in the form of a user interface (UI) in the terminal or the device, so the user can adjust the antenna direction or move the device with reference to the displayed CQ. If the CQ is defined as reception power, in an exemplary embodiment of the present invention, whether or not antennas are to be adjusted can be known by using a change in reception power and the CQI of each antenna together with the formal channel performance information called CQI used in the LTE.

First, the case where a measurement value of an antenna of an actually received signal is informed to the terminal or the device will now be described. This method is performed when the user sets an expert mode in an antenna setting mode, in which the user changes the direction of the antenna or the device upon viewing downlink throughput of the terminal or the device.

Namely, when the device or the terminal is in a stop state, the user adjusts the antenna or the device in a direction in which the optimal measurement value is indicated with reference to the CQ (BER or received power) of the antenna displayed on the display unit 151. If the measurement value is rapidly dropped, the user may adjust the antenna or device in a direction in which a better CQ (BER or received power) value is provided to adjust an optimum downlink environment.

When the device or the terminal moves to become away from the BS, the measurement value of the CQ (BER or received power) may be dropped. In this case, whether or not the dropping of the measurement value of the CQ is caused as the device or the terminal becomes away from the BS can be recognized through the reception power measurement item called the RSRP. If the CQ is used as received power, whether or not the antenna is to be changed can be known compared with the CQI instead of RSRP.

In a state that the RSRP is fixed, when the CQ (BER) is dropped, the user changes the direction of the antenna. In this case, when the RSRP is displayed and then the CQ is displayed for each antenna, an engineer may naturally know which antenna is to be moved to better the downlink channel environment.

In this case, with the LTE device or the mobile terminal having the multiple antennas, the user can hardly determine a point at which the downlink channel environment is to be improved by moving a desired antenna based on the actual measurement value.

Thus, the present invention provides a method for displaying an antenna adjustment state internally in the terminal or the device. This method is performed when the user sets a general user mode in the antenna setting menu.

Namely, upon collectively determining the RSRP, the CQ (BER or received power) and the CQI, whether or not each antenna needs to be adjusted is displayed for the user convenience, or an alarm message such as 'Adjust X antenna', 'Adjust X and Y antennas', or 'Adjust all antennas' may be outputted to induce the user to recognize it and behave accordingly.

In this manner, by using the alarm message indicating antenna adjustment displayed on the display unit of the LTE terminal or the device or by using the actual RSRP (a sort of pilot signal), the CQ or the CQI, the user can immediately recognize which one of antennas needs to be adjusted in the MIMO and effectively cope with the situation.

FIG. 10 is a flow chart illustrating the process of a channel state display method of a mobile terminal having multiple antennas according to an exemplary embodiment of the present invention.

As shown in FIG. 10, the controller 180 receives a downlink signal which has been transmitted from the BS and measures a predefined channel measurement item (S10, S11). The channel measurement item includes a CQI, a BER, an RSSI, an RSCP, and an RSRP, and more items may be added as necessary.

When the detained channel measurement item is measured, the controller 180 determines a channel state of the antenna provided in the terminal based on the measured channel measurement item (S12) and checks the antenna setting mode (S13).

If the antenna setting mode is the general user mode, the controller 180 displays whether to adjust antennas in a pop-up window of the display unit 151 according to the antenna mounting forms (i.e., the internal antennas, external antennas, and mixed-type antennas) (S14). Meanwhile, if the antenna setting mode is an expert mode, the controller 180 displays an actual measurement value (CQ and RSRP) in a pop-up window of the display unit 151 (S15).

The example of displaying whether to adjust antennas or displaying of an actual measurement value according to the set state of the antenna setting mode will now be described in detail.

As mentioned above, the LTE system uses multiple antennas, so the LTE terminal or the device (i.e., a notebook computer, a PC, a smart phone, etc.) basically includes two or more antennas. For the sake of brevity, in an exemplary embodiment of the present invention, four antennas will be explained as an example. Some of four antennas installed at the device may be external antennas and the other may be internal antennas. Accordingly, in an exemplary embodiment of the present invention, whether or not each antenna needs to be adjusted may be differently displayed according to how they are installed as well as the set state of the antenna setting mode.

Figure 11:
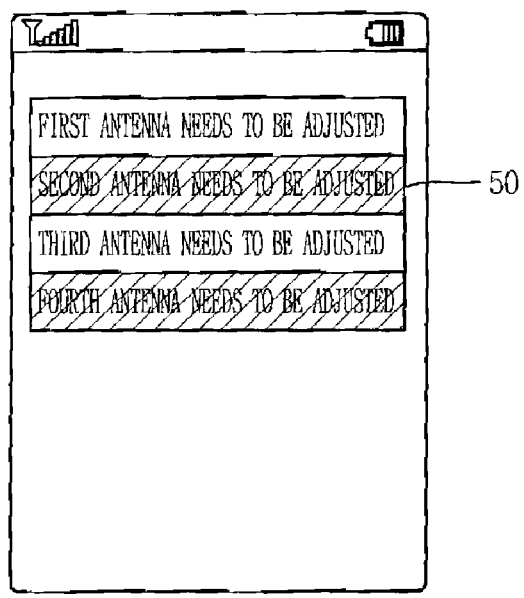
FIG. 11 illustrates an example of displaying whether or not each antenna needs to be adjusted in an LTE terminal.

FIG. 11 illustrates an example of displaying whether or not each antenna needs to be adjusted in an LTE terminal.

As shown in FIG. 11, the controller 180 determines a channel state of the four antennas provided in the LTE terminal based on the channel measurement item measured from a downlink signal. Upon determination, if reception performance of the second and fourth antennas are poorer than that of the other antennas, the controller 180 displays an image indicating that the second and fourth antennas should be adjusted on a pop-up window 50 of the display unit 151. In displaying the image, every form such as color, a character size, a check box, and the like, discernible from the other antennas can be used. In addition, in displaying the image, a predetermined list form as shown in FIG. 11 may be displayed or a message may be displayed within the pop-up window 50 or a balloon as shown in FIG. 12.

Figure 13:
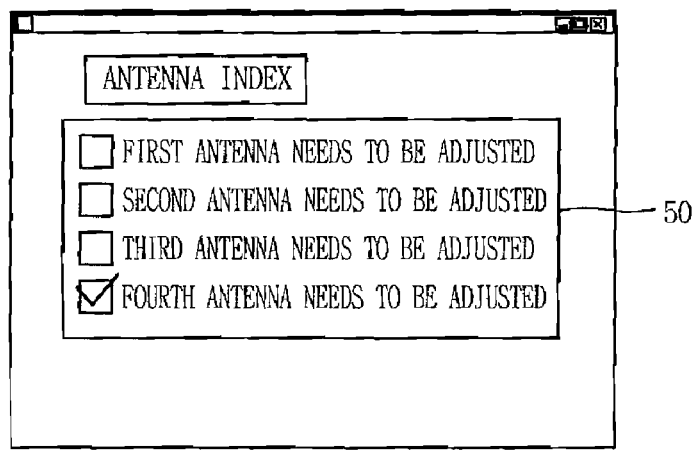
FIG. 13 illustrates an example of a screen display showing whether or not each antenna needs to be adjusted in a notebook computer.

FIG. 13 illustrates an example of a screen display showing whether or not each antenna needs to be adjusted in a notebook computer.

Because the LTE is highly likely to be used for a large capacity of data FTP or a broadcast Internet, its service is likely to be provided to notebook computers rather than terminal form. When multiple antennas are applied to a notebook computer, a controller (not shown) may indicate the check box of the fourth antenna in the pop-up window 50 as shown in FIG. 13, in order to inform the user that the reception performance of the fourth antenna is poor so the fourth antenna should be adjusted.

Figure 12:
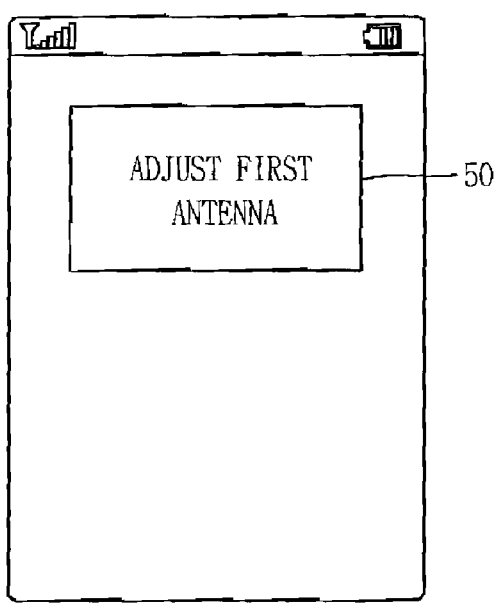
FIG. 12 illustrates another example of displaying whether or not each antenna needs to be adjusted in the LTE terminal.

FIGS. 11 to 13 show the display screen indicating whether or not the external antennas are to be adjusted, which can be applicable to a case where every antenna is protruded. However, antennas may be all internally installed or may be mounted in a mixed type according to the size of the terminal or the device or according to an applied frequency.

Figure 14:
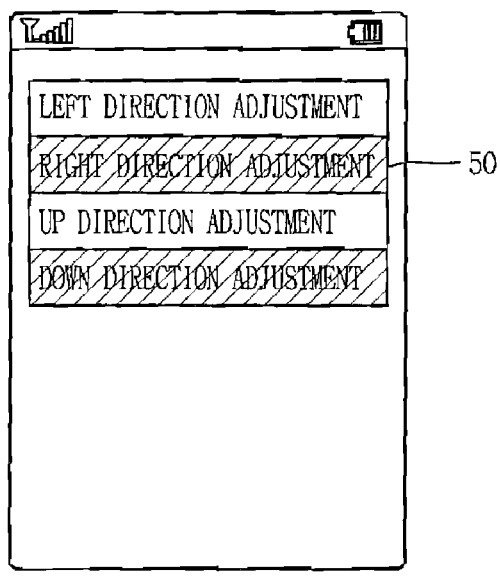
FIG. 14 illustrates an example of a screen display showing whether internal antennas are to be adjusted according to an exemplary embodiment of the present invention.

FIG. 14 illustrates an example of a screen display showing whether internal antennas are to be adjusted according to an exemplary embodiment of the present invention.

As shown in FIG. 14, when all the antennas are internally installed, the user already knows the positions of the antennas within the terminal. The terminal or device may determine an antenna with a poor reception performance by collectively determining the state of the antennas, and may display a movement direction of the antenna to be moved on the pop-up window 50, namely, such that it is to be moved to the right side or in a downward direction.

Thus, when the user uses the notebook computer in a café or library, the user can improve the downlink reception performance by moving the direction or position of the notebook according to the displayed movement direction. In this case, the controller determines the movement position by using the CQ information (BER or received power), the RSRP, or the CQI measured from the external antennas or each antenna.

Figure 15:
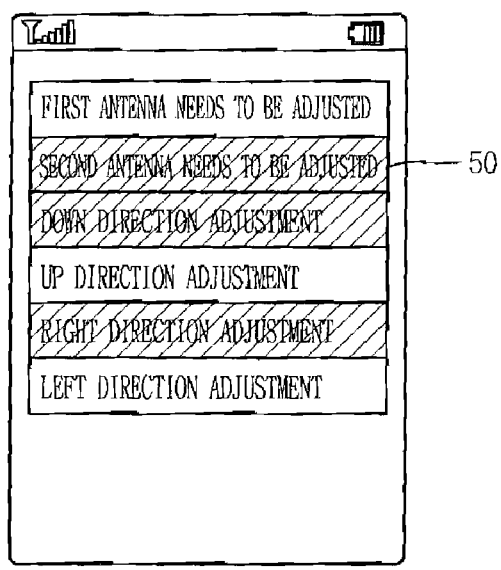
FIG. 15 illustrates an example of a screen display showing whether mixed-type antennas are to be adjusted according to an exemplary embodiment of the present invention.

FIG. 15 illustrates an example of a screen display showing whether mixed-type antennas are to be adjusted according to an exemplary embodiment of the present invention.

FIG. 15 shows a case where first and second antennas are external antennas and two other antennas are internal antennas. The controller displays the movement direction with respect to the two internal antennas and also displays whether the two external antennas are to be adjusted on the pop-up window 50. Namely, the controller 180 displays that the second antenna needs to be currently adjusted and antennas installed at a lower position and at the right side need to be currently adjusted.

In order to display whether or not each antenna needs to be adjusted on the pop-up window 50, the user must initially set the general user mode or the expert mode in the antenna setting menu. The general user mode is a mode in which the terminal or device collectively determines the states of the antennas and displays whether or not each antenna needs to be adjusted, because the user cannot perform antenna adjustment based on an actual measurement value. The expert mode is a mode in which an actual measurement value is displayed to allow an expert such as an engineer adjusts each antenna.

Figure 16:
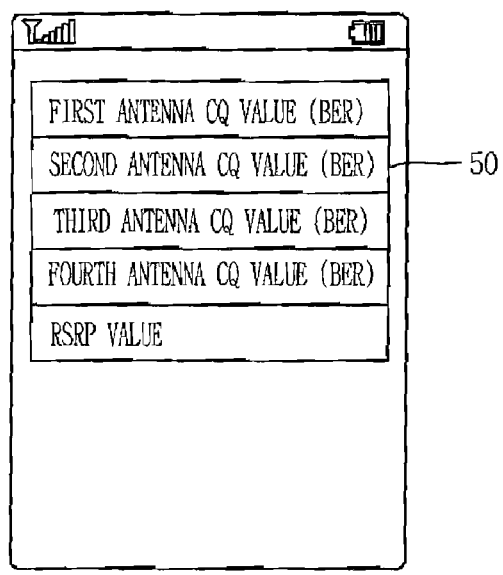
FIGS. 16 and 17 illustrate an example of actual measurement values displayed when an expert mode is set according to an exemplary embodiment of the present invention.
Figure 17:
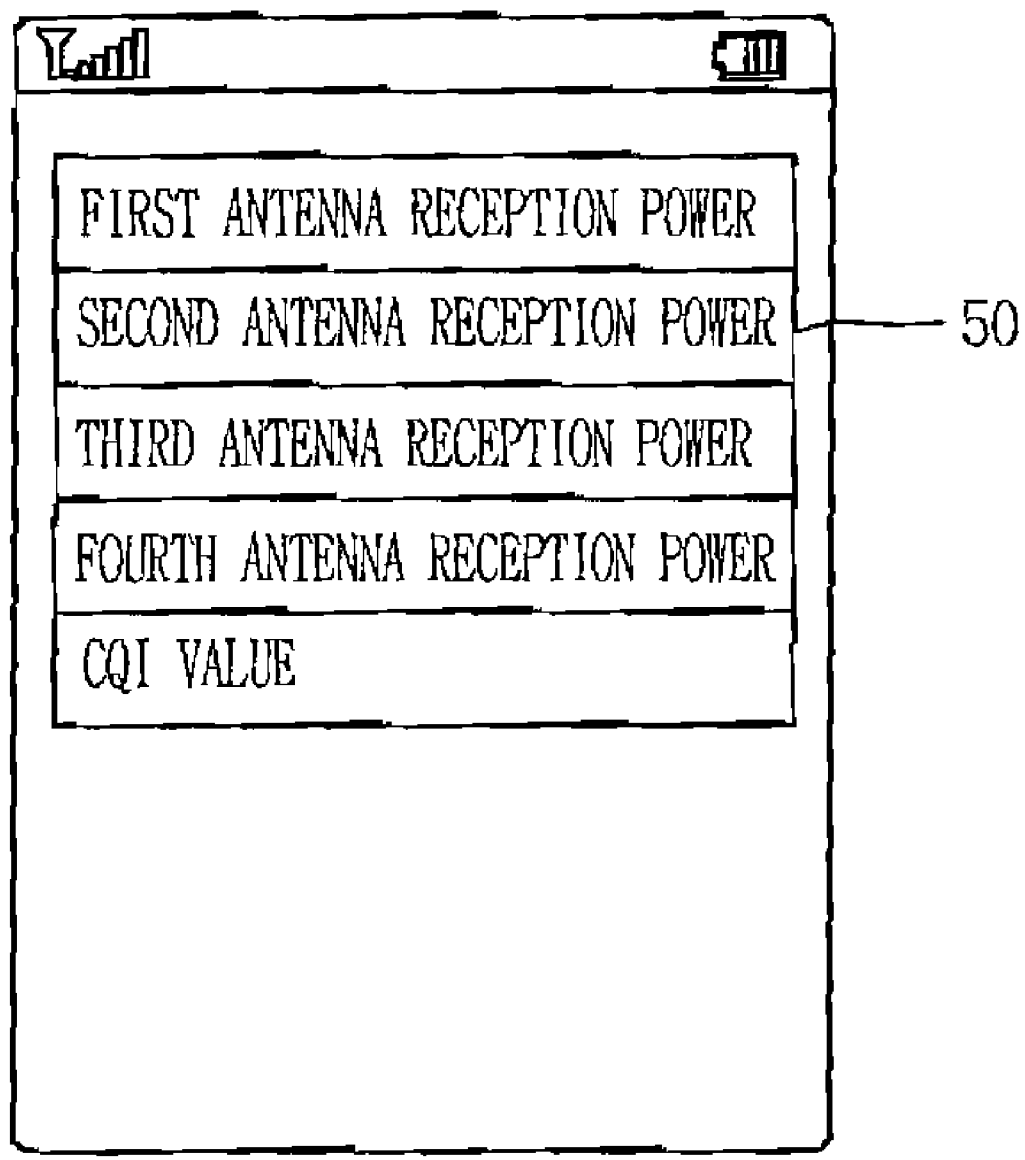

FIGS. 16 and 17 illustrate an example of actual measurement values displayed when an expert mode is set according to an exemplary embodiment of the present invention.

FIG. 16 shows the case where when a BER is used as a CQ value, an RSRP is also displayed. For example, when a BER value of each antenna is displayed in a state that the RSRP is displayed, the expert can recognize which antenna is to be moved to better the downlink channel environment.

FIG. 17 shows the case where a reception power, not the BER, is set as the CQ. In this case, reception power of each antenna is displayed after the CQI value is displayed. The expert checks an antenna with a poor reception power value among the four antennas in a state that the CQI value is dropped, and then adjusts the direction of the corresponding antenna. Also, in this case, in the occurrence of handover, reception power of the four antennas is likely to be degraded, so antenna adjustment is not performed.

The present invention can be used for a USB type data card having multiple antennas. For the data card, basically, the remaining antennas, excluding one antenna or an internal antenna, can be mounted as separation type antennas. In this case, the separation type antennas can be connected or separated by using a jack, so they can be easily applicable to a terminal.

As so far described, in the present invention, channel state information of each antenna is measured with respect to downlink signals through multiple antennas, and whether or not each antenna needs to be adjusted is displayed or a reception performance value of each antenna is displayed in real time based on the measured channel state information and the antenna setting mode. Accordingly, the user can improve the reception performance by actively changing the direction of the antennas connected with the terminal or the device or by actively changing the terminal (or device).

In an exemplary embodiment of the present invention, the above-described method can be implemented as software codes that can be read by a computer in a program-recorded medium. The computer-readable medium may include various types of recording devices in which data that can be read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). In addition, the computer may include the controller 180 of the terminal.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. An antenna information display method of a mobile terminal, the method comprising:
   receiving downlink signals via multiple antennas of the mobile terminal, the multiple antennas including at least one internal antenna and at least one external antenna;
   measuring channel state information for each antenna of the multiple antennas; and
   displaying antenna adjustment information based on the measured channel state information and an antenna mounting form corresponding to each antenna and an antenna setting mode set for the mobile terminal,
   wherein the displayed antenna adjustment information indicates at least one external antenna of the multiple antennas that needs to be adjusted and a direction toward which at least one internal antenna of the multiple antennas needs to be pointed in order to improve reception power.

2. The method of claim 1, wherein the channel state information comprises a reception power or reference signal received power (RSRP) and a bit error rate (BER) of each antenna.

3. The method of claim 1, wherein the channel state information comprises a reception performance or channel quality indicator (CQI) and a reception power (Pwr) of each antenna.

4. The method of claim 1, wherein the antenna adjustment information is displayed in the form of a list in a pop-up window or in the form of a message.

5. The method of claim 1, wherein the at least one external antenna that needs to be adjusted and the at least one internal antenna that needs to be pointed are included in the displayed antenna adjustment information and are distinguishably displayed with respect to other antennas of the multiple antennas that do not need to be adjusted or pointed.

6. The method of claim 1, wherein displaying the antenna adjustment information comprises:
   determining a channel state for each antenna based on the measured channel state information;
   checking the antenna setting mode that was set in a user menu;
   displaying whether or not any of the multiple antennas needs to be adjusted when the checked antenna setting mode is set as a general user mode; and
   displaying the measured channel state information for each antenna when the checked antenna setting mode is set as an expert mode.

7. The method of claim 6, wherein the displayed channel state information comprises a reception power or reference signal received power (RSRP) and a bit error rate (BER) of each antenna.

8. The method of claim 6, wherein the displayed channel state information comprises a reception performance or channel quality indicator (CQI) and a reception power (Pwr) of each antenna.

9. The method of claim 1, wherein the antenna adjustment information is displayed only when the mobile terminal is not performing handover.

10. The method of claim 1, wherein the multiple antennas comprise four antennas.

11. The method of claim 1, wherein the multiple antennas comprise two internal antennas and two external antennas.

12. The method of claim 1, wherein the antenna mounting form indicates whether each antenna is an external antenna or an internal antenna.

13. The method of claim 1, wherein the antenna adjustment information indicates that the at least one external antenna needs to be adjusted such that a direction of the at least one external antenna is changed by moving the at least one external antenna.

14. The method of claim 1, wherein the displayed antenna adjustment information includes a list including each of the multiple antennas.

15. The method of claim 14, wherein necessity of adjustment for each antenna included in the list is indicated.

16. A mobile terminal comprising:
   multiple antennas including at least one internal antenna and at least one external antenna, each of the multiple antennas configured to receive a downlink signal;
   a memory configured to store an antenna setting mode set for the mobile terminal; and
   a controller configured to:
      measure channel state information for each antenna of the multiple antennas; and
      display antenna adjustment information on a display screen of the mobile terminal according to the measured channel state information and an antenna mounting form corresponding to each antenna and the stored antenna setting mode,
   wherein the displayed antenna adjustment information indicates at least one external antenna of the multiple antennas that needs to be adjusted and a direction toward which at least one internal antenna of the multiple antennas needs to be pointed in order to improve reception power.

17. The mobile terminal of claim 16, wherein the channel state information comprises a reception power or reference signal received power (RSRP) and a bit error rate (BER) of each antenna.

18. The mobile terminal of claim 16, wherein the channel state information comprises a reception performance or channel quality indicator (CQI) and a reception power (Pwr) of each antenna.

19. The mobile terminal of claim 16, wherein the antenna adjustment information includes an antenna list indicating whether or not each of the multiple antennas needs to be adjusted or indicating at least one antenna that needs to be adjusted.

20. The mobile terminal of claim 19, wherein the antenna adjustment information is displayed in a pop-up window or in the form of a message.

21. The mobile terminal of claim 19, wherein the at least one external antenna that needs to be adjusted and the at least one internal antenna that needs to be pointed and are included in the antenna list and are displayed distinguishably with respect to other antennas of the multiple antennas that do not need to be adjusted or pointed.

22. The mobile terminal of claim 16, wherein the controller is further configured to display the antenna adjustment information only when the mobile terminal is not performing handover.

23. The method of claim 16, wherein the multiple antennas comprise two internal antennas and two external antennas.

24. The method of claim 16, wherein the antenna mounting form indicates whether each antenna is an external antenna or an internal antenna.

25. The method of claim 16, wherein the antenna adjustment information indicates that the at least one external antenna needs to be adjusted such that a direction of the at least one external antenna is changed by moving the at least one external antenna.

* * * * *